United States Patent [19]

Petron

[11] Patent Number: 4,873,784
[45] Date of Patent: Oct. 17, 1989

[54] DISK SHAPED FISHING LINE BOBBER

[76] Inventor: Terry L. Petron, 3905 25th Ave., So., Minneapolis, Minn. 55406

[21] Appl. No.: 309,116

[22] Filed: Feb. 13, 1989

[51] Int. Cl.$^4$ .............................................. A01K 93/00
[52] U.S. Cl. .................................................... 43/44.95
[58] Field of Search .................... 43/17.5, 44.87, 44.9, 43/44.92, 44.95

[56] References Cited

U.S. PATENT DOCUMENTS

| | | | |
|---|---|---|---|
| 2,038,108 | 11/1933 | Henley | 43/44.9 |
| 2,779,122 | 5/1955 | DeGroff | 43/44.9 |
| 2,966,001 | 3/1958 | Sader | 43/44.95 |
| 3,392,475 | 7/1965 | Vakousky | 43/44.9 |
| 3,578,748 | 5/1971 | Hurd | 43/44.9 |
| 3,605,316 | 9/1971 | Rogers | 43/44.9 |
| 3,714,731 | 2/1973 | Benson | 43/44.95 |
| 4,351,128 | 9/1982 | Sivertsen | 43/44.95 |
| 4,501,564 | 2/1985 | Cairone | 43/17.5 |

Primary Examiner—Nicholas P. Godici
Assistant Examiner—Michael William Starkweather
Attorney, Agent, or Firm—Leo Gregory

[57] ABSTRACT

This invention relates to a fishing line bobber consisting of a pair of disk or plate-like members of some thickness formed of a buoyant material and held in a juxtaposed operating position by an axial holding member, said holding member in cooperation with said plate-like member providing a sufficient friction hold for a fishing line wound thereabout and yet permitting a sliding position adjustment of said bobber on the fishing line.

1 Claim, 1 Drawing Sheet

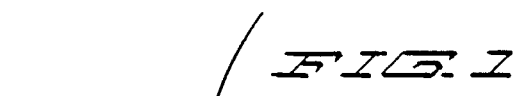
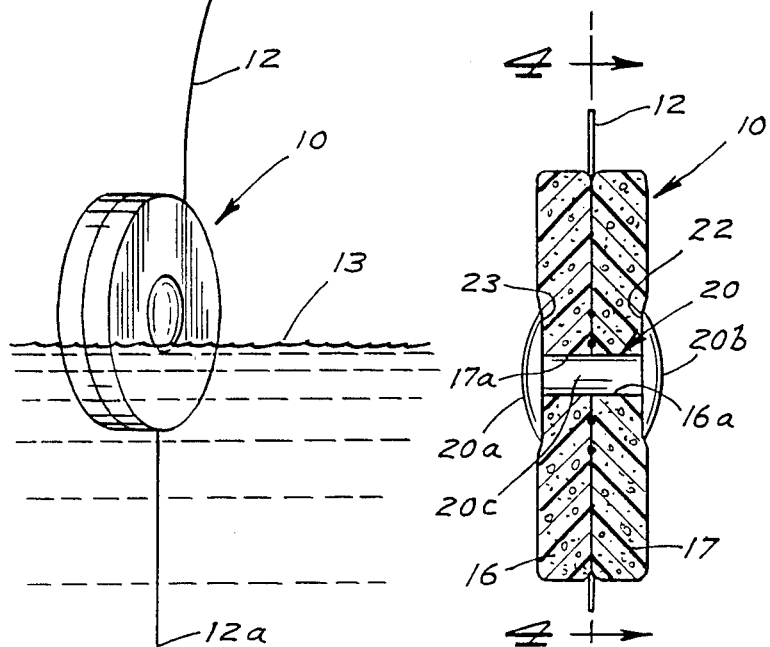
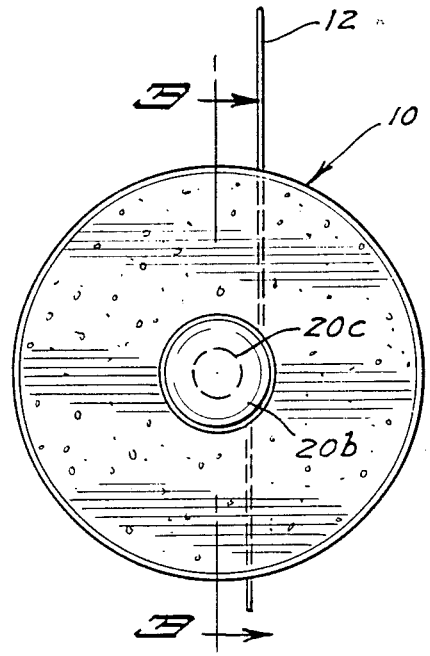
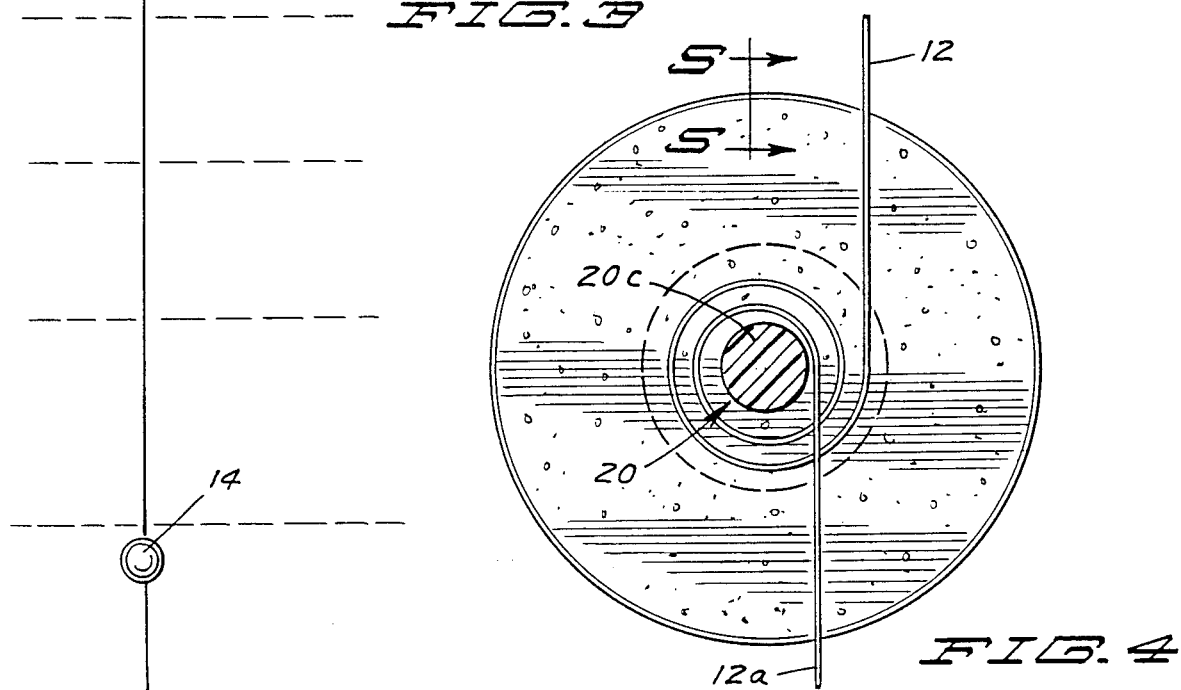
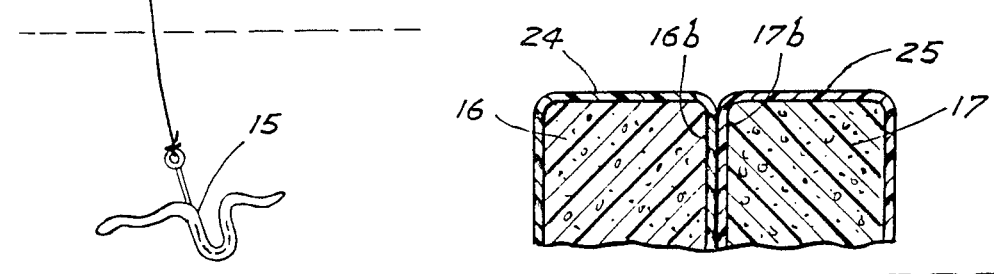

DISK SHAPED FISHING LINE BOBBER

BACKGROUND OF THE INVENTION

1. Field of Invention

This invention relates to a fishing line bobber.

2. Description of the Prior Art

Bobbers are an essential item in fishing particularly in still fishing, to hold the line and the bait thereon at a suitable depth in the body of water being fished.

Fishing line bobbers are of various kinds ranging from a slit cork to spherical bobbers of various arrangements. Some bobbers have friction grips to hold a line and others require that the line be tied to the bobber. Various floatable materials are used.

SUMMARY OF THE INVENTION

Presented here is a novel improvement in the art of bobbers. A buoyant material of coated cellular plastic foam is used in forming a pair of plate-like members of some thickness in a juxtaposed position having an axial member such as a double headed rivet disposed therethrough to hold the same together.

BRIEF DESCRIPTION OF THE DRAWINGS

FIG. 1 is a view in perspective showing the device in operating position;

FIG. 2 is a view in front elevation;

FIG. 3 is a view in vertical transverse section taken in line 3—3 of FIG. 2 as shown;

FIG. 4 is a view in a central diametrical section taken on line 2—2 of FIG. 3 as shown; and FIG. 5 is a broken view on an enlarged scale showing a detail of structure.

DESCRIPTION OF A PREFERRED EMBODIMENT

Referring to the drawings, the device comprising the invention herein is indicated generally by the reference numeral 10.

In FIG. 1, the invention is shown in operating position on a line 12 floating in a body of water 13 and the line, as is customary, is provided with a sinker 14 and a baited hook 15.

The invention 10 as here illustrated comprises a pair of disk or plate-like members 16 and 17 which have some thickness such as on the order of one fourth inches. The plate members are formed of a buoyant material and preferably of a closed cell plastic foam material. To preserve the body of the material of said plate-like members, which may be of various diameters, said plate-like members are suitably made such as of a two pound density of the well known Evelite and the same is coated with a layer of suitable water impervious plastic coating sealant material as by a dipping process.

For good visability and for whatever attracting ability it may have in drawing or captivating the attention of fish, said plate members 16 and 17 are coated with a material having a bright florescent appearance such as of orange and yellow.

Said plate or plate-like members 16 and 17 are apertured through their centers as at 16a and 17a and disposed through said apertures is a holding member 20 shown herein the form of a double headed rivet having outer end enlarged and somewhat semi-spherical head portions 20a and 20b which retains said plate members in juxtaposed operating position and it is noted that slight depressions are indicated at 22 and 23.

The plate members 16 and 17 are independent of each other but have engaging adjacent sides 16b and 17b.

The line 12 is readily slipped between said plate members and is wound once or twice about the shank 20c of said rivet 20 as shown in FIGS. 2 and 4. However one winding has been found to sufficiently well hold the bobber in place on the fishing line a little effort is required to slide the bobber on the line to change its position. If the line is wound two or more times around said shank, it is easily unwound to change its position. The bright colors if said plate members 16 and 17 may not contribute to the utility of the bobber but they make the bobber highly visible and it may well be an attraction for fish.

The use of the bobber appears to be clearly evident from the description.

It will of course be understood that various changes may be made in form, details, arrangement and proportions of the parts without departing from the scope of the invention herein which generally stated, consists in an apparatus capable of carrying out the objects above set forth, in the parts and combination of parts disclosed and defined in the appended claims.

What is claimed is:

1. A bobber to be mounted on a fishing line comprising:
    a pair of buoyant plate-like members in a juxtaposed operated position;
    an axial rivet with the head portions larger than the shaft portion, wherein the center of said members are captured, compressed, and depressed between the heads of the rivet whereby said bobber is attached to said fishing line by wrapping said line around said shaft positioning said line within said member's compressed region.

* * * * *